United States Patent [19]

Dowell et al.

[11] 4,150,697
[45] Apr. 24, 1979

[54] TREATMENT OF REGENERATED CELLULOSE CASINGS WITH SURFACE ACTIVATING ENERGY

[75] Inventors: Arthur M. Dowell; Henry E. Judd, both of Danville, Ill.

[73] Assignee: Teepak, Inc., Chicago, Ill.

[21] Appl. No.: 887,407

[22] Filed: Mar. 17, 1978

[51] Int. Cl.² .......................... F16L 11/00; B29F 5/00
[52] U.S. Cl. .............................. 138/118.1; 156/244.17; 264/22; 264/80; 264/209; 426/420
[58] Field of Search ............... 264/22, 80, 198, 95, 264/209; 156/244.17, 272; 426/420; 138/118.1

[56] References Cited

U.S. PATENT DOCUMENTS

| 2,022,360 | 11/1935 | Petersen | 264/22 |
| 2,999,756 | 9/1961 | Shiner et al. | 264/198 |
| 3,017,339 | 1/1962 | Dewey | 264/22 |
| 3,523,850 | 8/1970 | Uhlige | 264/22 |

FOREIGN PATENT DOCUMENTS 2705013  11/1977  Fed. Rep. of Germany ............. 264/22

*Primary Examiner*—Jay H. Woo
*Attorney, Agent, or Firm*—Paul Shapiro; Joseph E. Kerwin; William A. Dittmann

[57] ABSTRACT

A sausage casing surface formed from regenerated cellulose is exposed to a source of surface activating energy to an extent sufficient to induce a change in the surface whereby the casing will adhere to a sausage emulsion encased therein and follow the shrinkage of the sausage during processing.

8 Claims, No Drawings

TREATMENT OF REGENERATED CELLULOSE CASINGS WITH SURFACE ACTIVATING ENERGY

BACKGROUND OF THE INVENTION

This invention relates to new and useful improvements in regenerated cellulose sausage casings.

Dry sausage, of which the various salami and cervelats are examples, is usually prepared by a process which involves drying as one of the process steps. Dry sausage is ordinarily served cold, without further cooking by the consumer. The term "dry sausage" as used herein includes within its meaning the entire range of dry and semi-dry sausage products.

The manufacture of dry sausage customarily involves mixing desired proportions of fat and lean meats, beef or pork or mixtures thereof, with selected spices, seasonings, and curing materials to form an emulsion which is initially cured at a few degrees above freezing (36° to 38° F.) for one or two days so that the emulsion will be preserved sufficiently to be smoked and dried.

The chill cured meat emulsion is then firmly packed into casings of suitable size and shape, and the ends of the casings are tied, ready for delivery to the drying room or smokehouse, depending on the type of sausage. The stuffed dry sausage is smoked and then dried, while unsmoked dry sausage is dried only. The drying or curing time will vary with the particular type of sausage being processed and to some extent with the processing conditions. However, 30 to 60 days is usually considered a minimum time, and periods of 60 to 90 days or more are used under some circumstances.

Previously, the sausage meat emulsions were stuffed into casings formed of natural materials or animal products such as sewn beef middles and hog casings. More recently, synthetic materials have been developed out of which casings could be formed, particularly casings formed of regenerated cellulose per se or of the product known in the art as fibrous casing and which is composed of cellulosic fibers, preferably a long fiber saturating tissue, impregnated with and held together by regenerated cellulose.

Fibrous casing is made by passing a ribbon of paper around a mandrel to form a tube, applying viscose to the outside surfaces of the paper tube and in between the overlapped portion thereof which is to become a seam. The viscose impregnated tube is passed through a coagulating bath containing acid wherein regeneration of the viscose takes place. The tube is then washed and dried according to the procedures described, for example, in U.S. Pat. Nos. 1,937,225 and 2,045,349.

One of the drawbacks of cellulosic casing materials is their lack of ability to shrink with the sausage during the drying of the sausage emulsion. In the preparation of dry sausages, the sausages encounters up to a 30–40% weight loss and tends to shrink away from the synthetic casing and leave gaps between the meat and the casing in which there is a tendency for mold and/or a so-called "brown ring" to develop. The brown ring is generally comprised of a layer of grease which will rapidly turn rancid during storage of the dry sausage. This problem is ordinarily not encountered when natural casings are used since natural casings tend to expand and contract with the sausage during curing.

In the manufacture of some wet sausages, and specifically liver sausages, wherein substantial amounts, e.g., 15–30% fat are added to the meat product, unstable meat emulsions are encountered. During processing of these wet sausage products in the cellulosic casing, separation of the meat from the casing may occur. When such separation occurs, fat and gelatin material will accumulate in the gap between the meat product and the casing. This "fattening out" and the formation of "gelatin pockets" is undesirable from a consumer acceptance standpoint.

The problem of producing cellulosic casings which adhere satisfactorily to sausages during preparation and processing thereof has been at least partially solved by the application of certain proteinaceous materials such as gelatin and glutraldehyde as a protein hardening agent to the interior of such casings, as disclosed in U.S. Pat. No. 3,383,223. One drawback to the use of hardened gelatin as an adhesive coating for casing interiors is that the coating may adhere too strongly to the meat, with the result that when it is attempted to remove the casing from the meat mass, there is occasionally a tendency for some meat to adhere to the casing and be torn from the sausage with the casing, thereby causing surface marring of the sausage. In other instances, due to variations in the meat emulsion formulations or in the processing conditions there can result a degree of adherence of the casing to the meat product which hinders removal of the casing from the product encased therein to a degree that a substantial amount of meat product is removed with the casing.

SUMMARY OF THE INVENTION

This invention is based upon our discovery that walls of regenerated cellulose casings, including regenerated cellulose films, paper reinforced cellulose casings, both in flat form and in tubular form, which form the surfaces of the casing can be exposed to a source of surface activating energy which is effective to induce a change in the surface walls of the casing whereby the casing will adhere to dry sausage emulsion and follow the shrinkage of the sausage during curing, but has a low level of meat adhesion and releases readily from the sausage emulsion when the casing is separated therefrom.

Bombardment of the surface of the casing with surface activation energy such as ultraviolet radiation or ionized gas molecules, produced as in the case of corona discharge, excites the surface molecules of the casing and causes hetero and homolytic bond cleavage which results in the production of ions and free radicals in the surface which are in turn responsible for the adherence of the processed meat emulsion to the casing wall.

PREFERRED EMBODIMENTS

The term "surface activating energy" as used herein means a source of energy which will produce ions or free radicals in the surface of a substrate by exposure of the substrate to the energy source. Sources of surface activating energy include high energy electron radiation such as electron beam radiation, x-rays, ultraviolet radiation and corona discharge.

Sources of high energy radiation include Van de Graff generators, electron accelerators and the like. The accelerators when used are of the type capable of supplying an average energy of from about 100 KEV to about 300 KEV (thousand electron volts). As another measure of high energy radiation, U.S. Pat. No. 3,247,012, discloses that the potential of an electron beam may be in the range of 150,000 to 450,000 volts.

Ultraviolet radiation are light waves emitted from an artificial source having a wave length in the range between 4,000 angstroms (A°) and 1,800 A°. To improve the adhesiveness of regenerated cellulose substrates to cured meat emulsion, mercury vapor discharge lamps, especially of the medium pressure type are used as a source of ultraviolet radiation to which the web of regenerated cellulose is exposed. The output of commercially available medium pressure mercury vapor lamps varies between 100 to 200 watts per linear inch of lamp surface.

When a medium pressure mercury lamp is used as a source of ultraviolet radiation the distance between the lamp and the casing surface should be in the range of 0.25 to 12 inches.

It has been found that subjecting the casing surface to ultraviolet radiation emitted by medium pressure, U.V. lamps, for an exposure period of 0.5 to 5 seconds, is sufficient to induce the desired change in the casing surface.

The surface of the cellulosic casing can be subjected to an electrical discharge wherein the web of the cellulosic material is passed between spaced electrodes, e.g., a distance of 0.001 to 1.0 inch, the electrodes having applied thereto a high voltage, alternating field of between 25 and 400 $MH_z$.

The high voltage alternating field produced between the electrodes is sufficient to ionize a portion of the air between the electrodes. When air is ionized, it becomes a conductor capable of carrying current. When one of the pair of electrodes is energized, the other electrode is maintained at ground, a corona discharge occurs across the width of the web which effects the modification of the cellulosic web surface to improve the meat adhesion properties thereof.

Treatment of the casing surface with a high voltage alternating field wherein a corona occurs across the width of the web is referred to in this application as "corona discharge."

Exposure of the internal walls of the casing to a source of surface activating energy may be accomplished in any desired way. Thus, treatment of conventional tubular regenerated cellulose casing, fibrous casing, or any other kind of casing can be effected by inverted the casing by hand to expose the internal walls of the casing.

In manual inversion of casing, one end of the individual casing is pulled through the bore of the casing so that the casing is inverted. Alternatively any of the several mechanical methods now in practice in the casing industry may be used to invert the casing.

A further alternative technique for modifying the surface characteristics of the cellulosic casing is to expose the surfaces of cellulosic sheets per se before they are formed into tubes. For example, the sides of sheets of cellulose impregnated fibrous sheeting which are to form the internal walls of the casing can be exposed to a source of surface activation energy for a time sufficient to induce the desired change in the surface thereof. After this treatment, the sheeting can be formed into a tube by any conventional technique.

The following examples further illustrate the invention but are not to be construed as limiting the scope of the invention.

EXAMPLE I

Thirty inch lengths of fibrous casing were manually inverted, pressed flat and placed on a continuously moving conveyor which passed under a medium pressure mercury lamp having a width of 4 inches. The radiation emitted by the lamp was approximately 200 watts/in. of lamp surface. The conveyor was adjusted so that the fibrous casing travelled under the surface of the ultraviolet lamp so that the casing walls were 3.0 inches from the lamp surface. The speed of the conveyor belt was adjusted so that the casing was exposed to the ultraviolet radiation for about 1.0 second to effect surface treatment of the exposed wall surface.

The procedure was repeated to treat the opposite unexposed flat side of the casing. The ultraviolet radiated casing was then reinverted and stuffed with summer sausage emulsion according to standard commercial practice. The casing adhered to and followed the shrinkage of the sausage so that there was no separation of the casing from the sausage during processing of the sausage in the casing. After the processing was completed the casings were found to strip from the encased sausage meat with satisfactory cling and with a minimal and acceptable amount of meat adhering thereto.

For purposes of comparison, the procedure of Example I was repeated with the exception that the internal walls of the casing were not exposed to U.V. radiation. When filled and processed with the same summer sausage emulsion, extensive separation of the casing from the sausage was noted and a layer of grease covering the surface of the separated sausage product was observed.

EXAMPLE II

The procedure of Example I was repeated with the exception that the fibrous casing to be exposed to ultraviolet radiation was coated on its exterior surface with a vinylidene chloride polymer and the ultraviolet treated casing was filled with liver sausage. The casing adhered to and followed the shrinkage of the sausage so that there was no separation of the casing from the sausage during processing of the sausage in the casing. After the processing was completed, the casings were found to strip from the encased sausage meat with satisfactory cling and with a minimal and acceptable amount of meat adhereing thereto.

For purposes of comparison, the procedure of Example II was repeated with the exception that the internal walls of the casing were not exposed to U.V. radiation. When filled and processed with the same summer sausage emulsion, separation of the casing from the meat occurred, resulting in an extensive "fattening out" and the formation of gelatin pockets was noted in the gap between the sausage product and the casing walls.

EXAMPLE III

The procedure of Example I was repeated with the exception that the inverted casing was exposed to a corona discharge. The inverted casing was placed on a continuously moving conveyor and passed between the electrodes of a corona discharge apparatus. The electrodes consisted of pairs of rollers which were positioned horizontally in tandem. Each upper roll was covered full length with a sleeve of synthetic rubber and functioned as an electrode. The lower rolls were chrome plated steel and acted as a ground. The spacing between the roll pairs was slightly less than the thickness of the exposed casing, with the dielectric covering material being compressed, so as to provide positive movement of the casing through the rollers as well as to maintain contact with the grounding rolls. A corona discharge was initiated with a power input of 2 kw D.C., (i.e., 24 kv at a frequency of 20 kHz). Each side of the casing was passed through the corona discharge twice. Exposure time to the corona discharge for each pass was seconds.

The corona discharge treated casings were stuffed with summer sausage according to standard commercial practice.

The casing adhered to and followed the shrinkage of the sausage so that there was no separation of the casing from the sausage. After processing was completed, the casings were found to strip from the sausage product with satisfactory cling and with a minimal and acceptable amount of meat adhering to the walls of the casing.

For purposes of comparison, the procedure of Example III was repeated with the exception that the walls of the casing were not exposed to corona discharge. When filled and processed with the same summer sausage emulsion, extensive separation of the casing from the sausage was noted and a layer of grease covering the surface of the separated sausage product was observed.

EXAMPLE IV

The procedure of Example III was repeated with the exception that the fibrous casing to be exposed to corona discharge was coated on its exterior surface with a vinylidene chloride polymer and the corona discharge treated casing was filled with liver sausage. The casing adhered to and followed the shrinkage of the sausage so that there was no separation of the casing from the sausage during processing of the sausage in the casing. After the processing was completed the casings were found to strip from the encased sausage meat with satisfactory cling and with a minimal and acceptable amount of meat adhering thereto.

For purposes of comparison, the procedure of Example III was repeated with the exception that the internal walls of the casing were not exposed to corona discharge. When filled and processed with the same summer sausage emulsion, separation of the casing from the meat occurred, resulting in an extensive "fattening out" and the formation of gelatin pockets was noted in the gap between the sausage product and the casing walls.

What is claimed is:

1. In the method of manufacturing cellulosic casings suitable for the encasement and processing of sausage meat emulsions, the improvement which comprises exposing the meat contacting surfaces of the casing to a source of surface activating energy to an extent sufficient to induce a change in the surface of the casing whereby the casing shrinks with sausage meat emulsions encased and processed in the casing.

2. The method of claim 1 wherein the source of surface activating energy is ultraviolet radiation.

3. The method of claim 1 wherein the source of surface activated energy is a corona discharge.

4. The method of claim 1 wherein the cellulosic casing is a regenerated cellulosic casing.

5. The method of claim 1 wherein the cellulosic casing is a fiber reinforced cellulosic casing.

6. A cellulosic casing prepared by the method of claim 1.

7. A cellulosic casing prepared by the method of claim 2.

8. A cellulosic casing prepared by the method of claim 3.

* * * * *